United States Patent

Tohmon et al.

Patent Number: 5,321,708
Date of Patent: Jun. 14, 1994

[54] OPTICAL FIBER AMPLIFIER DOPED WITH DYSPROSIUM ION FOR THE 1.3 μM WAVELENGTH BAND

[75] Inventors: Genji Tohmon; Hisanao Sato; Jun Ohya; Toshihiro Fujita, all of Osaka, Japan

[73] Assignee: Matsushita Electric Industrial Co., Ltd., Osaka, Japan

[21] Appl. No.: 39,772

[22] Filed: Mar. 26, 1993

[30] Foreign Application Priority Data

May 8, 1992 [JP] Japan ................................. 4-116259

[51] Int. Cl.$^5$ ................................................. H01S 3/14
[52] U.S. Cl. ........................................ 372/6; 359/341; 385/142
[58] Field of Search ................ 372/6; 385/24, 123, 385/141, 142, 27; 359/341

[56] References Cited

U.S. PATENT DOCUMENTS

| | | | |
|---|---|---|---|
| 4,701,928 | 10/1987 | Fan et al. | 372/68 |
| 5,042,039 | 8/1991 | Edagawa et al. | 372/6 |
| 5,131,069 | 7/1992 | Hall et al. | 385/142 |

FOREIGN PATENT DOCUMENTS

63-011546 1/1988 Japan.
5029699 2/1993 Japan.

OTHER PUBLICATIONS

L. Cognolato et al., "Fabrication of an Active Optical Fibre by a Non-Aqueous Solution Doping Method and its Characterization", Journal of Materials Science Letters, vol. 9, No. 12, pp. 1395-1396 (Dec. 1990).

J. Ainslie et al., "The Absorption and Fluorescence Spectra of Rare Earth Ions in Silica-Based Monomode Fiber", Journal of Lightwave Technology, vol. 6, No. 2, pp. 287-292 (Feb. 1988).

S. Davey et al., "Rare Earth Doped Fluorozirconate Glasses for Fibre Devices", British Telecom Technology Journal, vol. 7, No. 1, pp. 58-68 (Jan. 1989).

Ohishi et al., "Pr$^{3+}$-doped Fluoride Fiber Amplifier Operating at 1.31 μm", Optics Letters, vol. 16, No. 22, pp. 1747-1749, Nov. 15, 1991.

Miyajima et al., "38.2dB Amplification at 1.31 μm and Possibility of 0.98 μm Pumping in Pr$^{3+}$-doped Fluoride Fibre", Electronics Letters, vol. 27, No. 19, pp. 1706-1707, Sep. 12, 1991.

Brierley et al., "Amplification and Lasing at 1350nm in a Neodymium Doped Fluorozirconate Fibre", Electronics Letters, vol. 24, No. 7, pp. 438-439, Mar. 31, 1988.

Durteste et al., "Amplification and Lasing at 1.3 μm in Praseodymium-doped Fluorozirconate Fibres", Electronics Letters, vol. 27, No. 8, pp. 626-628, Apr. 11, 1991.

Primary Examiner—John D. Lee
Attorney, Agent, or Firm—Willian Brinks Hofer Gilson & Lione

[57] ABSTRACT

A core of a fluorozirconate optical fiber is doped with rare earth ions, namely trivalent Dy ions. The Dy ion makes an absorption transition with excitation light generated by an 800 nm semiconductor laser module. Then the Dy ion undergoes transitions, namely a nonradiative transition involving phonon emission, a transition to a metastable excited level, and a radiative transition wherein radiation corresponding to the 1.28 μm to 1.35 μm range occurs, thereafter returning to its ground state level. The Dy ion having an electrovalence of three can be pumped with a high-output 800 nm semiconductor laser module and is not subject to saturation at a lower energy level of population inversion. Using an optical fiber of the invention, a higher gain is obtained in the region of 1.3 μm telecommunications window.

9 Claims, 4 Drawing Sheets

OPTICAL FIBER AMPLIFIER DOPED WITH DYSPROSIUM ION FOR THE 1.3 μM WAVELENGTH BAND

This is an invention in optical fibers, optical amplifiers, optical transmission systems, and solid-state lasers for use in telecommunication, information processing, and optical instrumentation control applying coherent light.

Many types of optical amplifiers, which make use of rare-earth-ion-doped fibers, are known in the art. For example, Er-ion-doped optical amplifiers for signal light at a band of 1.5 μm, and Pr-ion-doped optical amplifiers and Nd-ion-doped optical amplifiers for signal light at a band of 1.3 μm are especially important.

But if signal light at a band of 1.5 μm is transmitted down a conventional existing optical fiber for signal light at a band of 1.3 μm, signal degradation owing to wavelength dispersion in the optical fiber takes place. To cope with this, an expensive network of fibers of wavelength dispersion correction type is required, which makes it difficult for the Er-ion-doped optical amplifier to be put in practical use.

The Nd-ion-doped optical amplifier is not able to efficiently make use of a conventional 1.31 μm signal light source, since the center of its gain range is positioned at 1.34 μm.

Now consideration is given to using a Pr-ion-doped optical amplifier. This optical amplifier uses an excitation light source corresponding to the absorption wavelength range created by the inherent energy level in Pr ions, whereby light excitation by means of the excitation light source creates the $^3H_4$-$^1G_4$ transition and the action of amplification occurs due to population inversion between the $^1G_4$ level and the $^3H_5$ level.

A Pr-ion-doped optical amplifier is detailed by Yasutake Ohishi et al. in "$Pr^{3+}$-doped fluoride fiber amplifier operating at 1.31 μm" in Optics Letters, Vol. 16, No. 22, pages 1747-1749.

It is characteristic of Pr ions that a gain of 38.2 dB is obtained for 300 mW excitation light, which is described by Y. Miyajima et al in "38.2 dB amplification at 1.31 μm and possibility of 0.98 μm pumping in $Pr^{3+}$-doped fluoride fibre" in Electronics Letters, Vol. 27, No. 19, pages 1706-1707.

An excitation light source for the Pr-ion-doped optical amplifier may be either a Ti:Al2O3 laser, pumped by an Ar ion laser that oscillates at a wavelength of 1.017 μm, or a semiconductor laser with a wavelength of 1.017 μm.

The Ti:Al 2O3 laser, as an excitation light source used for the Pr-ion-doped optical amplifier, is large in size, which inhibits practical use. On the other hand, the semiconductor laser at 1.017 μm has a quantum well structure and its output is around 50 mW. Further, this semiconductor laser is not suitable for mass production, so it has not been commercialized yet.

Additionally, the $^3H_5$ level (i.e., a lower level of population inversion) is lowered down to the ground state level by the nonradiative transition (phonon emission). Furthermore, the rare-earth-ion, when doped in a fluoride-based optical fiber, has a lesser probability of phonon emission as compared to when doped in a silica-based optical fiber. Accordingly, the increase in excitation light intensity makes the ion population at the $^3H_4$ level (i.e., a lower level of population inversion) greater than that at the ground state level. Therefore, absorption transition to the $^1G_4$ level (i.e., the upper level of the emission transition), lessens, resulting in the saturation of gain.

An optical amplifier by a Pr-ion-doped optical fiber has the above-described problems.

Meanwhile, the rate-earth-ion-doped solid-state laser is described by M. C. Brierlery and C. A. Millar in "Amplification and Lasing at 1350 nm in a neodymium doped fluorozirconate fibre" in Electronics Letters, Vol. 24, No. 7, pages 438-439, and by Y. Durteste el al. in "Amplification and Lasing at 1.3 μm in Praseodymium-doped Fluorozirconate Fibres" in Electronics Letters, Vol. 27, No. 8, pages 626-628. The former article describes a fluorozirconate optical fiber doped with Nd ions, while on the other hand the latter one describes another doped with Pr ions. Both, described in these articles, have a four-level transition structure in which excitation light is first absorbed, a transition to an upper level of population inversion by phonon emission occurs, another transition, during which light at a band of 1.3 μm is radiated, occurs, and a further transition from a lower level of population inversion to the ground state level by phonon emission occurs.

However, in the rare-earth-ion-doped solid-state laser, the probability of phonon emission is low if there is the energy difference greater than 1000 $cm^{-1}$, between energy levels of a fluorozirconate optical fiber. This leads to a longer lifetime at the lower level of population inversion, so that absorption action, with respect to the output of an excitation light source, becomes saturated as the excitation light source increases its output. As a result, the output of the solid-state laser becomes saturated. For a solid-state laser with an optical fiber doped with Nd ions, the intensity of light at 1.3 μm is 4.5 mW when the output of the excitation light source is 260 mW. On the other hand, for a solid-state laser with an optical fiber doped with Pr ions, the light intensity is 4.5 mW when the output of the excitation light source is 250 mW. Both solid-state lasers suffer from a low lasing efficiency.

For a solid-state laser with a Nd-ion-doped optical fiber, an Ar laser with an oscillation wavelength of 514 nm is used as an excitation light source, whereas a solid-state laser with a Pr-ion-doped optical fiber uses a Nd:YAG laser with an oscillation wavelength of 1.064 μm. These large-sized lasers, however, are impractical.

The above-described rare-earth-ion-doped solid-state lasers present problems in that their excitation light source is impractical, the laser output at a band of 1.3 μm is low, and the laser output is saturated as excitation light intensity increases.

These problems are common to optical fibers made by doping an optical material with rare-earth-ions, and optical amplifiers, optical transmission systems, and solid-state lasers using such optical fibers.

Bearing in mind the above problems, the present invention was made to provide a compact practical efficient optical fiber, optical amplifier, optical transmission system, and solid-state laser by allowing rare-earth-ions doped into an optical material to be pumped by a high-output semiconductor laser and by preventing such rare-earth-ions from being saturated at a lower level of population inversion.

SUMMARY OF THE INVENTION

This invention is made according to the knowledge that a Dy ion having an electrovalence of three can be excited to the absorption excitation level by a high-output 800 nm semiconductor laser and is not subject to saturation at a lower level of population inversion. In accordance with the present invention, an optical material constituting a higher-refractive-index area in an optical fiber is doped with Dy ions having an electrovalence of three.

An optical fiber is disclosed in the invention. This optical fiber comprises a higher-refractive-index area and a lower-refractive-index area. The difference in refractive index between the higher-refractive-index area and the lower-refractive-index area is 0.01–1% with respect to the refractive index of the lower-refractive-index area. An optical signal with a wavelength range of 800–1400 nm is propagated in a single transverse mode. The higher-refractive-index area is formed of an optical material which is doped with 100–10000 ppm of Dy ions having an electrovalence of three.

Due to such difference in refractive index as described above, optical signals can be transmitted in a single transverse mode.

Because an optical material is doped with at least 100 ppm of Dy ions, excitation light can be effectively absorbed, and because an optical material is doped with at most 10000 ppm of Dy ions, the process of doping can easily be done.

The Dy ion having an electrovalence of three, when doped into, for example, a fluorozirconate optical material, has an absorption excitation level between 7000 to 1300 cm$^{-1}$. Further, the Dy ion having an electrovalence of three is pumped with a high-output semiconductor laser with a light wavelength of 800 nm resulting in making a transition to the absorption excitation level.

The Dy ion does not return to its ground state level from a lower level of population inversion by a non-radiative transition (i.e., phonon emission). For this reason, the electron population at the lower level of population inversion will not increase so that no saturation occurs at the lower level of population inversion. The invention therefore provides an improved optical fiber with a high-efficiency light-transmission performance.

An optical amplifier is disclosed in the invention. This optical amplifier comprises an excitation light source which radiates excitation light formed of semiconductor laser beams and includes a semiconductor laser module which is so modularized that the excitation light can be taken out of an output optical fiber; a coupler which includes an optical fiber coupler or an optical waveguide coupler to combine the excitation light with 1.3 μm-band signal light radiated from the excitation light source; and an optical fiber comprising a higher-refractive-index area formed of an optical material doped with Dy ions having an electrovalence of three and a lower-refractive-index area wherein output light radiated from the coupler is incident upon an incident portion of the optical fiber, is amplified, and is emitted out from an emitting portion of the optical fiber.

In accordance with this optical amplifier, the Dy ion is pumped with an 800 nm semiconductor laser and makes an energy level transition to the absorption excitation level. Further, the Dy ion suffers no saturation at a lower level of population inversion. This allows the optical amplifier to make use of high-output, compact, less power consumption semiconductor lasers (AlGaAs/GaAs lasers, for example) as an excitation light source. Since no saturation occurs at a lower level of population inversion, this allows an 800 nm semiconductor laser to obtain the same gain that a large-sized Ti:A1203 laser does.

An optical transmission system is disclosed in the invention. This optical transmission system comprises an excitation light source which radiates excitation light formed of semiconductor laser beams and includes a semiconductor laser module which is so modularized that the excitation light can be taken out of an output optical fiber; a signal light source which radiates signal light formed of 1.3 μm-band semiconductor laser beams with an oscillation wavelength range of 1.3–1.35 μm and includes a semiconductor laser module which is so modularized that the signal light can be taken out of an output optical fiber; an electric signal source for feeding the signal light source with electric signals; a first coupler including an optical fiber coupler or an optical waveguide coupler to combine the excitation light radiated from the excitation light source with the signal light radiated from the signal light source; an optical fiber comprising a higher-refractive-index area formed of an optical material doped with Dy ions having an electrovalence of three and a lower-refractive-index area wherein output light radiated from the first coupler is amplified and is emitted; a second coupler including an optical fiber coupler or an optical waveguide coupler to divide the output light radiated from the optical fiber into excitation light and signal light; a distributor to distribute the signal light radiated from the second coupler; and a photodetector to receive the signal light distributed with the distributor.

In accordance with the this optical transmission system incorporating the foregoing optical amplifier, high-output signal light enters the distributor, allowing the distributor to multi-distribute such signal light. Therefore, the present invention provides an optical transmission system which is compact, practical and efficient. Further, the present invention can provide an optical transmission system of 1.3 μm-band multiple-distribution type.

A solid-state laser is disclosed in the present invention. This solid-state laser comprises an excitation light source which radiates excitation light formed of 800 nm-band semiconductor laser beams with an oscillation wavelength range of 800–860 nm; an optical fiber comprising a higher-refractive-index area formed of an optical material doped with Dy ions having an electrovalence of three and a lower-refractive-index area wherein the excitation light from the excitation light source is incident upon the optical fiber; an incident portion reflector which is provided at an incident portion of the optical fiber and has a high reflection index for light with a wavelength range of 800–1000 nm as well as for light with a wavelength range of 1200–1400 nm; and an emitting portion reflector that is provided at an emitting portion of the optical fiber and has a high reflection index for light with a wavelength range of 800–1000 nm while having an 80–99.5% reflection index for light with a wavelength range of 1200–1400 nm, wherein the incident portion reflector and the emitting portion reflector together constitute an optical cavity resonator.

In accordance with this solid-state semiconductor laser, the Dy ion having an electrovalence of three, doped into the higher-refractive-index area of the optical fiber, is pumped with a high-output 800 nm semiconductor laser and no saturation takes place at a lower level of population inversion. Therefore a high-output 1.3 μm-band semiconductor laser can be radiated from an emitting portion. The present invention provides a compact solid-state laser with a higher lasing efficiency.

BRIEF DESCRIPTION OF THE DRAWINGS

The present invention will become more apparent to those skilled in the art from the following description when considered in conjunction with the appended drawings, in which.

DETAILED DESCRIPTION OF THE INVENTION

With reference to the drawings, preferred embodiments of the invention are described below.

FIRST EMBODIMENT

Figure 1:
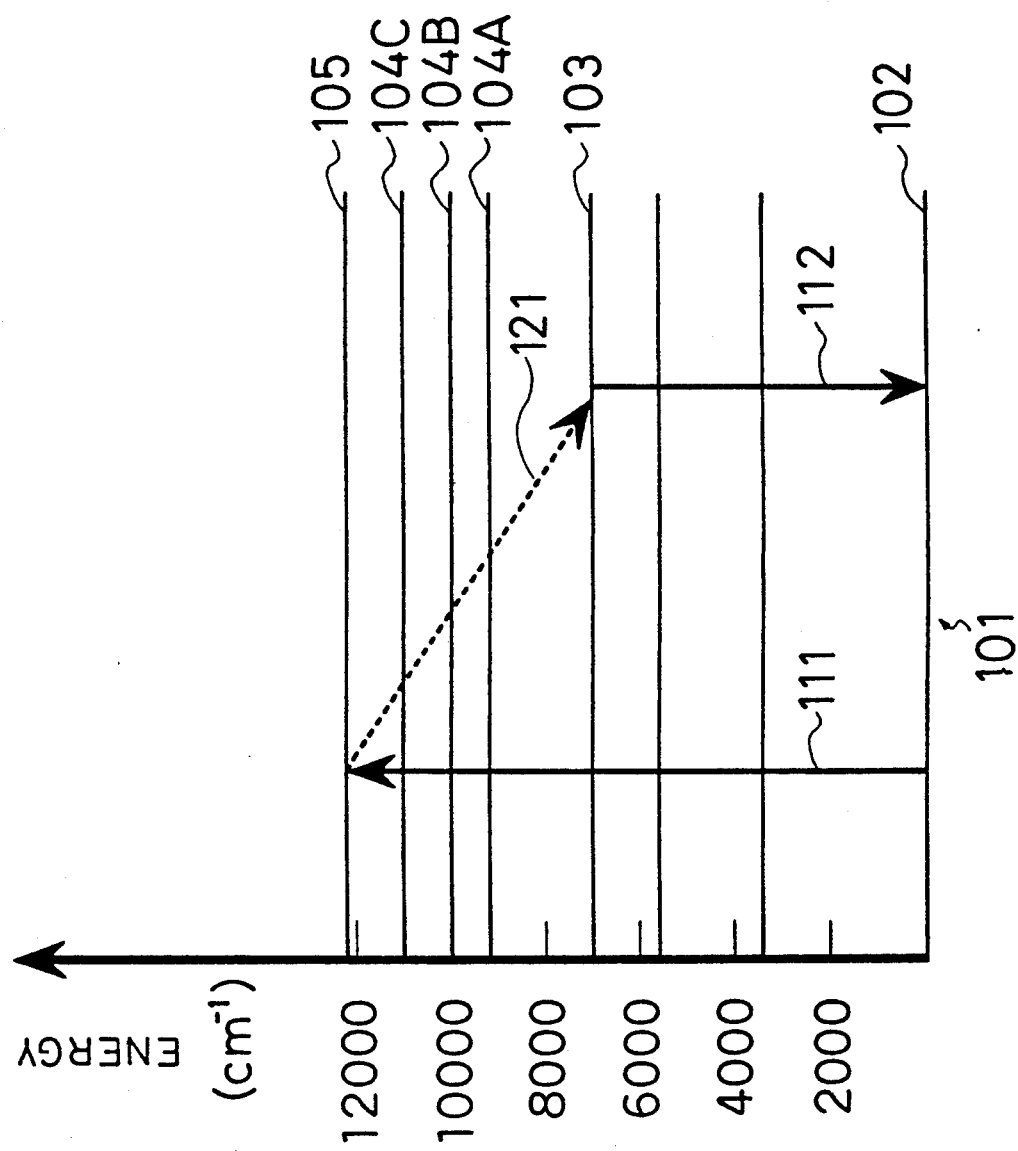
FIG. 1 is the energy level diagram of a Dy ion doped into a higher-refractive-index area of an optical fiber of a first embodiment of the invention.

An optical fiber of the first embodiment is explained by reference to FIG. 1 that shows the energy level transition of a Dy ion doped into this optical fiber. The energy level of a Dy ion doped into a fluorozirconate optical fiber is represented by reference numeral 101. The absorption transition, nonradiative transition, and radiative transition in the case of an 830 nm excitation light are represented by reference numerals 111, 121, and 112, respectively. In the figure, reference numerals 102, 103, 104A, 104B, 104C, and 105 represent respective inherent energy levels in the Dy ion. More specifically, 102 denotes the ground state level (i.e., the $^6H_{15/2}$ level); 103 the metastable excitation levels (the $^6H_{9/2}$ and $^6F_{11/2}$ levels); 104A the $^6F_{9/2}$ and $^6H_{7/2}$ levels, 104B the $^6H_{5/2}$ level; 104C the $^6F_{7/2}$ level; and 105 the absorption excitation level (the $^6F_{5/2}$ level). The ordinate indicates the energy in $cm^{-1}$ (kayser).

A fluorozirconate optical material constituting a core of a higher-refractive-index area in an optical fiber, or ZBLAN ($ZrF_4$-$BaF_2$-$LaF_3$-$AlF_3$-$NaF$) is doped with 100-10000 ppm of Dy ions (i.e., 100/1000000-10000/1000000 by weight). If excitation light with a wavelength of 830 nm, which is in the energy absorption range of the core of the optical fiber, is incident upon the core, the energy level of the Dy ion doped into the core makes a transition to the absorption excitation level 105 by the absorption transition 111 then to the metastable excitation level 103 by the nonradiative transition 121 (phonon emission). Then the energy level of the Dy ion makes a transition to the ground state level 102 via the radiative transition 112 during which light with a wavelength of 1.25–1.35 $\mu m$ is radiated.

SECOND EMBODIMENT

An optical amplifier of the second embodiment is described which uses an optical fiber of the first embodiment.

Figure 2:
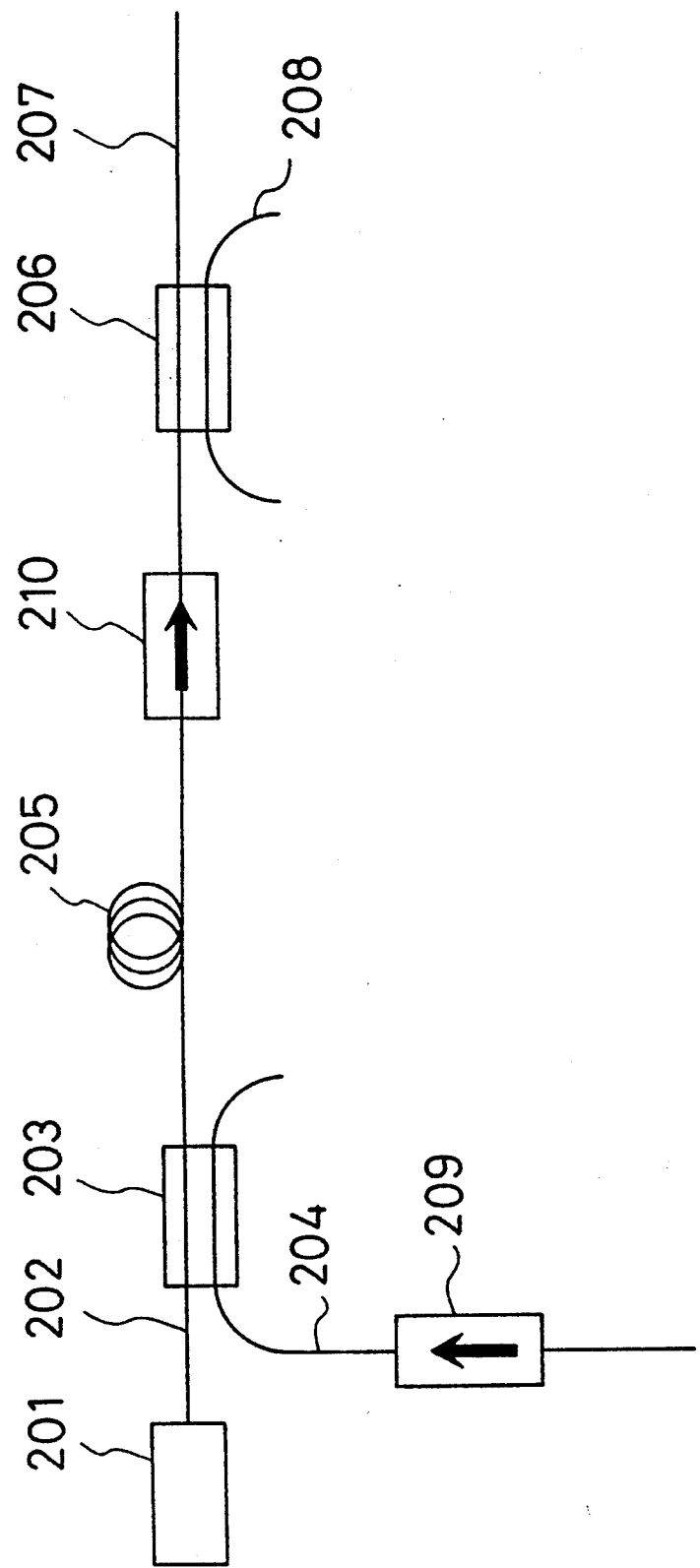
FIG. 2 shows a layout of an optical amplifier of a second embodiment of the invention.

FIG. 2 shows a configuration of this optical amplifier. A semiconductor laser module 201, which is so modularized that output light can be taken out of an output fiber 202, radiates an 800 nm-band semiconductor laser beam with an oscillation wavelength range of 800–850 nm for excitation. An optical fiber coupler 203 is used to combine excitation light radiated from the semiconductor laser module 201 with signal light at a band of 1.3 $\mu m$. An optical fiber 205 has a core doped with Dy ions, upon which output light from the optical fiber coupler 203 is incident. The output fiber 202 of the semiconductor laser module 201 is connected to one of input terminals of the optical fiber coupler 203, and the excitation light from the semiconductor laser module 201 is shone upon the optical fiber 205.

After passing through an isolator 209, 1.3 $\mu m$-band light is incident upon the optical fiber coupler 203 from a second input terminal of the optical fiber coupler 203, via an input fiber 204. As a result, amplified output light emerges at the terminal of the optical fiber 205.

This amplified output light is radiated from the optical fiber 205, passes through an isolator 210, and enters an optical fiber coupler 206. As a result, signal light is radiated from the terminal of a signal light emission fiber 207 while at the same time 830 nm excitation light is radiated from an excitation light emission fiber 208.

The second embodiment uses an excitation method called the forward excitation in which excitation light enters the same incident terminal that signal light is incident upon. There is another excitation method known as the backward excitation in which excitation light is shone upon an emitting terminal for signal light. For the backward excitation, the output terminal of the semiconductor laser module 201 is connected to the emitting terminal of the excitation light emission fiber 208. Alternatively, two excitation light semiconductor modules may be connected to both signal light incident and emitting terminals.

The characteristic of an optical amplifier by means of the forward excitation method is explained.

If excitation light radiated from the semiconductor laser module 201 is 1 W, such excitation light is absorbed into the optical fiber 205. Hence the doped Dy ion makes an energy level transition to the absorption excitation level 105 (FIG. 1). Thereafter the Dy ion makes another transition to the metastable excitation level 103 by the nonradiative transition 121 (phonon emission). The radiative transition 112 amplifies signal light at a band of 1.3 $\mu m$. It is proved, by the comparison of the input signal light intensity to the post-amplification output signal light intensity, that the obtained gain is 30–40 dB.

THIRD EMBODIMENT

An optical transmission system of the third embodiment is now described. This optical transmission system uses the optical amplifier 200 of the second embodiment.

Figure 3:
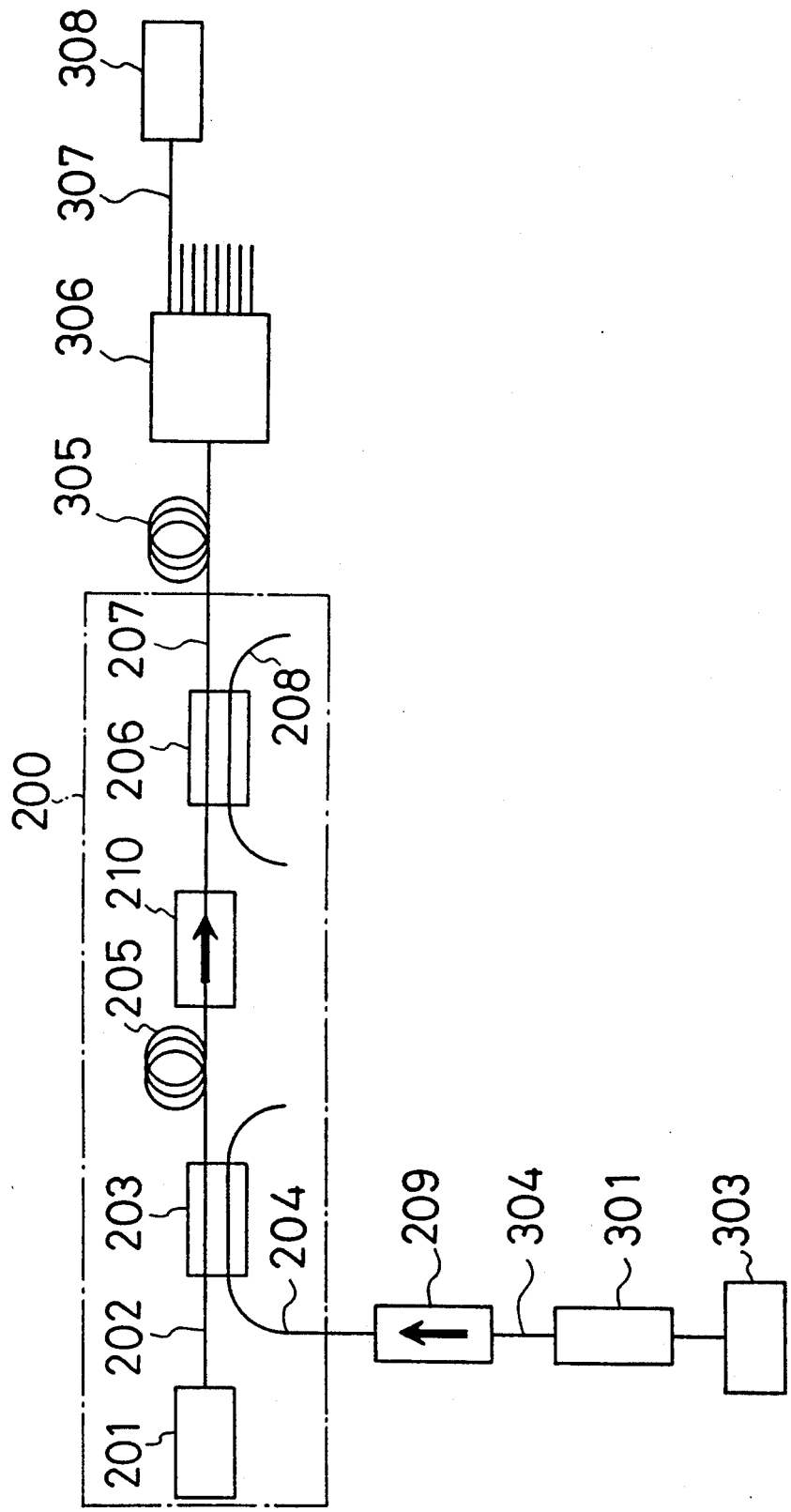
FIG. 3 shows a layout of an optical transmission system of a third embodiment of the invention.

FIG. 3 illustrates a layout of an optical transmission system of this embodiment. In this embodiment, corresponding structural elements to the structural elements 201, 202, 203, 204, 205, 206, 207, and 208 of the second embodiment are employed. A semiconductor laser module 301, which is so modularized that output can be taken out of an output fiber 304, radiates a 1.35 $\mu m$-band semiconductor laser beam with an oscillation wavelength range of 1.3–1.35 $\mu m$ for signal light. An electric signal source 303 feeds the semiconductor laser module 301 with electric signals. The output fiber 304 sends out the signal light from the semiconductor laser module 301. An optical fiber 305 is used to transmit the signal light that is radiated from the terminal of the signal light emission fiber 207 after being amplified by the optical amplifier 200. A distributor 306 distributes the signal light radiated from the optical fiber 305. A transmission fiber 307 transmits the signal light distributed by the distributor 306. A photodetector 308 receives the signal light from the transmission fiber 307.

The signal light, radiated from the semiconductor laser module 301, is modulated by an electric signal sent out from the electric signal source 303, advances through the output fiber 304, and enters the optical amplifier 200 via the isolator 209 then via the input fiber 204. The optical amplifier 200 performs the same function as described in the second embodiment. The signal light, emitted from the signal light emission fiber 207 after being amplified, enters the optical fiber 305. The signal light, radiated from the optical fiber 305, enters the distributor 306 that breaks up the signal light into eight, one of which is propagated through the transmission fiber 307 and is detected by the photodetector 308. In the present transmission system, the gain of the optical amplifier 200 is high, which allows the distributor 306 to achieve multiple-distribution of the signal light.

FOURTH EMBODIMENT

A rare-earth-ion-doped solid-state laser of the fourth embodiment is described. This rare-earth-ion-doped solidstate laser employs an optical fiber in accordance with the first embodiment.

Figure 4:
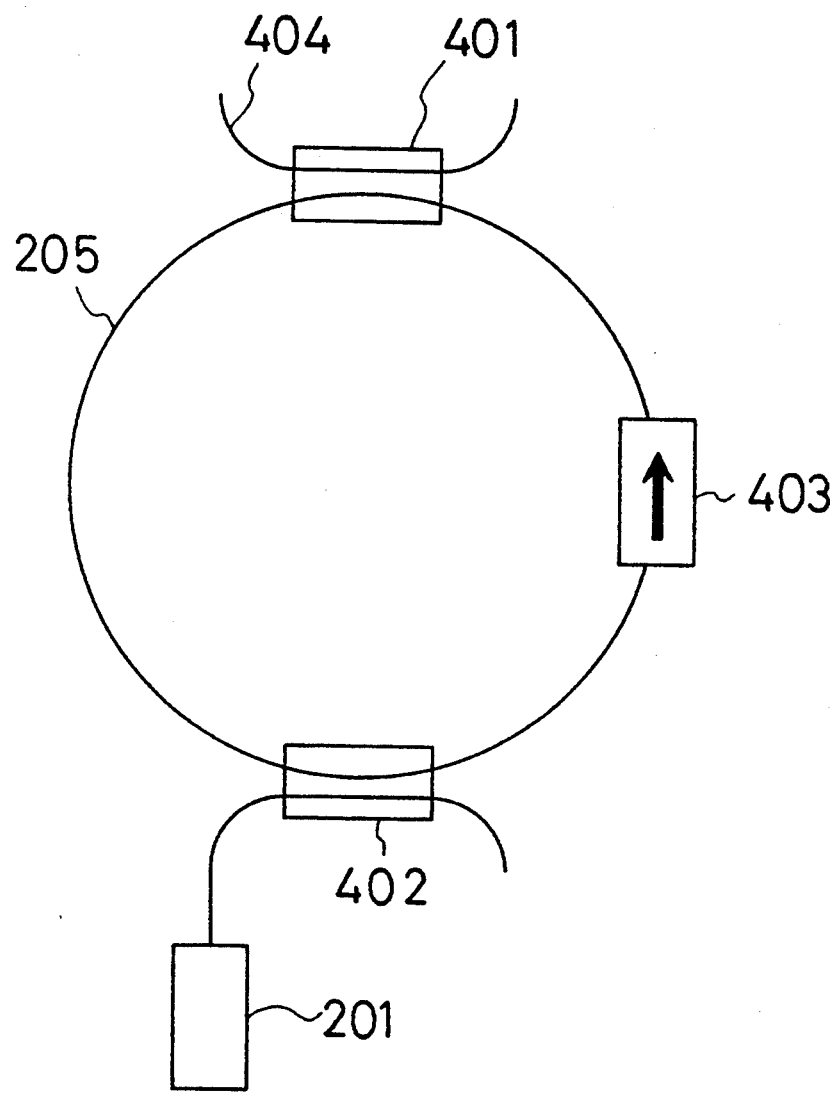
FIG. 4 shows a layout of a solid-state laser of a fourth embodiment of the invention.

FIG. 4 shows a layout of the rare-earth-ion-doped solid-state laser of this embodiment. A semiconductor laser module 201, which is so modularized that output can be taken out of an optical fiber, radiates an 800 nm-band semiconductor laser beam with an oscillation wavelength range of 800–850 nm for excitation. An optical fiber coupler 402 guides excitation light, radiated from the semiconductor laser module 201, to an optical fiber 205. A core of the optical fiber 205, which excitation light from the optical fiber coupler 402 is incident upon, is doped with Dy ions, as in the first embodiment.

In FIG. 4, an isolator for a wavelength of 1.3 $\mu$m, an optical fiber coupler that sends out 1.3 $\mu$m-band light, and an output fiber are represented by reference numerals 403, 401, and 404, respectively. Excitation light with a wavelength of 830 nm, radiated from the semiconductor laser module 201, is introduced by way of the optical fiber coupler 402 into the optical fiber 205. Light with a wavelength of 1.3 $\mu$m, radiated due to the radiative transition, is propagated through the optical fiber 205. The isolator 403 is provided so that the light with a wavelength of 1.3 $\mu$m advances in one direction only.

The light, introduced into the optical fiber 205, is then propagated through the optical fiber 205 doped with Dy ions of an amplification medium so that it is amplified to become stimulated emission light. In order to obtain the output of the stimulated emission light, the optical fiber coupler 401 is provided in the optical fiber 205 which has a branching ratio of 0.1–30% to 99.9–100% for light with a wavelength of 1.3 $\mu$m and a branching ratio of 0.1% to not less than 99.9% for light with a wavelength 830 nm. With such an arrangement, beams of 1.3 $\mu$m-band laser emerge at the output terminal of the optical fiber coupler 401. The structure of this optical resonator is called the ring-type optical resonator which is characterized by its very thin wavelength linewidth.

The characteristic of the rare-earth-ion-doped solid-state laser of this embodiment is described below. If light radiated from the semiconductor laser module 201 is 1 W, an output of 60 mW is achieved for 1.3 $\mu$m laser beams. This means that the lasing efficiency is 6%. On the other hand, for the case of a conventional Pr-ion-doped laser, if the output of an excitation light source is 2.5 W, an output of 4.5 mW is obtained, resulting in the lasing efficiency of 0.13%. The lasing efficiency is improved 50 times in accordance with this embodiment.

There are some semiconductor lasers that oscillate at a band of 1.3 $\mu$m. However, they all employ a Fabry-Perot optical resonator and a line width that is from several MHz to a few tens of MHz. Conversely, according to the solid-state laser of the fourth embodiment, 1.3 $\mu$m laser beams with a wavelength line width of 10 kHZ are obtained using a ring optical cavity resonator.

The fourth embodiment employs a ring optical cavity resonator, which, however, may use a Fabry-Perot optical resonator to obtain more output, although the line width becomes wider.

In the foregoing embodiments, the fluorozirconate material is used for an optical fiber. However, any crystal for laser, for example, $SiO_2$ may be used.

The optical amplifier of the second embodiment is described focusing on light amplification at a band of 1.3 $\mu$m for use in optical communication. However, it is understood that this optical amplifier may be used for light amplification at a different band.

In the optical amplifier of the second embodiment, a lower level of population inversion is given as the ground state level. However, a level higher than the ground state level may serve as a lower level of population inversion.

In the foregoing embodiments, one level lower than the level pumped by excitation light is given as an upper level of population inversion. However, a level higher than an excited level (that is, the level by an upconversion process) is available for the invention. There is much merit in it. 800 nm-band excitation light within the infrared region of the spectrum is made, by an upconversion process, available for the radiation or amplification of light within the visible region of the ultraviolet region. This results in a high-efficiency wavelength conversion.

In the foregoing embodiments, the higher-refractive-index area of the optical fiber is doped with Dy ions. However, it should be understood that a crystal, glass, and semiconductor may be used as an optical material being doped with Dy ions. Additionally, other forms other than optical fibers may be used. This is because the absorption and radiation of excitation light is carried out by a dopant, not by a host material.

In the foregoing embodiments, an 830 nm excitation light source is used to optically pump the $^6F_{5/2}$ level of the Dy ion. The reason for this is just that an 830 nm semiconductor laser module is used in the industry. However, any excitation process at other wavelengths may be used as long as there is an absorption level for a Dy ion.

It is understood that various other modifications to the above devices will become evident to those skilled in the art. The arrangement described herein is for illustrative purposes only and is not to be considered restrictive.

The invention claimed is:
1. An optical fiber comprising:
 a higher-refractive-index area; and
 a lower-refractive-index area;
 wherein:
 a difference in refractive index between the higher-refractive-index area and the lower-refractive- index area is 0.01–1% with respect to the refractive index of the lower-refractive-index area;
an optical signal in a wavelength range of 800–1400 nm is propagated in a single transverse mode; and
the higher-refractive-index area is formed of an optical material which is doped with 100–10000 ppm of Dy ions having an electrovalence of three.

2. An optical fiber of claim 1, wherein the optical material forming the higher-refractive-index area contains fluoride or $SiO_2$.

3. An optical amplifier comprising:
an excitation light source which radiates excitation light formed of semiconductor laser beams and includes a semiconductor laser module which is so modularized that the excitation light can be taken out of an output optical fiber;
a coupler which includes an optical fiber coupler or an optical waveguide coupler to combine the excitation light and 1.3 μm-band signal light radiated from the excitation light source; and
an optical fiber comprising a higher-refractive-index area formed of an optical material doped with Dy ions having an electrovalence of three and a lower-refractive-index area, wherein output light radiated from the coupler is incident upon an incident portion of the optical fiber, is amplified, and is emitted from an emitting portion of the optical fiber.

4. An optical amplifier of claim 3, further comprising an optical fiber coupler or an optical waveguide coupler which is connected to the emitting portion of the optical fiber and divides the output light radiated from the emitting portion into excitation light and signal light.

5. An optical amplifier of claim 3, wherein the optical material forming the higher-refractive-index area contains fluoride or $SiO_2$.

6. An optical transmission system which comprises:
an excitation light source which radiates excitation light formed of semiconductor laser beams and includes a semiconductor laser module which is so modularized that the excitation light can be taken out of an output optical fiber;
a signal light source which radiates signal light formed of 1.3 μm-band semiconductor laser beams with an oscillation wavelength range of 1.3–1.35 μm and includes a semiconductor laser module which is so modularized that the signal light can be taken out of an output optical fiber;
an electric signal source for feeding the signal light source with electric signals;
a first coupler including an optical fiber coupler or an optical waveguide coupler to combine the excitation light radiated from the excitation light source with the signal light radiated from the signal light source;
an optical fiber comprising a higher-refractive-index area formed of an optical material doped with Dy ions having an electrovalence of three and a lower-refractive-index area wherein output light radiated from the first coupler is amplified and is emitted;
a second coupler including an optical fiber coupler or an optical waveguide coupler to divide the output light radiated from the optical fiber into excitation light and signal light;
a distributor to distribute the signal light radiated from the second coupler; and
a photodetector to receive the signal light distributed by the distributor.

7. An optical transmission system of claim 6, wherein the optical material forming the higher-refractive-index area contains fluoride or $SiO_2$.

8. A solid-state laser comprising:
an excitation light source which radiates excitation light formed of 800 nm-band semiconductor laser beams with an oscillation wavelength range of 800–860 nm;
an optical fiber comprising a higher-refractive-index area formed of an optical material doped with Dy ions having an electrovalence of three and a lower-refractive-index area, wherein the excitation light from the excitation light source is incident upon the optical fiber;
an incident portion reflector which is provided at an incident portion of the optical fiber and has a high reflection index for light with a wavelength range of 800–1000 nm as well as for light with a wavelength range of 1200–1400 nm; and
an emitting portion reflector that is provided at an emitting portion of the optical fiber and has a high reflection index for light with a wavelength range of 800–1000 nm while having an 80–99.5% reflection index for light with a wavelength range of 1200–1400 nm;
wherein the incident portion reflector and the emitting portion reflector together constitute an optical resonator.

9. A solid-state laser of claim 8, wherein the optical material forming the higher-refractive-index area contains fluoride or $SiO_2$.

* * * * *